United States Patent
Varanasi et al.

(10) Patent No.: US 6,504,871 B1
(45) Date of Patent: Jan. 7, 2003

(54) IDCT PROCESSOR FOR USE IN DECODING MPEG COMPLIANT VIDEO BITSTREAMS MEETING 2-FRAME AND LETTERBOXING REQUIREMENTS

(75) Inventors: Surya P. Varanasi, Tracy, CA (US); Tai Jing, Palo Alto, CA (US)

(73) Assignee: LSI Logic Corporation, Milpitas, CA (US)

(*) Notice: Subject to any disclaimer, the term of this patent is extended or adjusted under 35 U.S.C. 154(b) by 2 days.

(21) Appl. No.: 08/904,085

(22) Filed: Jul. 31, 1997

(51) Int. Cl.[7] ............................................... H04N 7/12
(52) U.S. Cl. ................................................ 375/240.2
(58) Field of Search ............................... 348/384, 390, 348/403, 404; 382/248, 250; 364/725.01, 725.03; 375/240.2, 240.03; 708/400, 402, 401; H04N 7/12

(56) References Cited

U.S. PATENT DOCUMENTS

| | | | | |
|---|---|---|---|---|
| 5,379,351 A | * | 1/1995 | Fandrianto | 382/41 |
| 5,428,567 A | * | 6/1995 | Horvath | 365/78 |
| 5,479,364 A | * | 12/1995 | Jones | 364/725 |
| 5,590,066 A | * | 12/1996 | Ohki | 364/725 |
| 5,724,278 A | * | 3/1998 | Ohgose et al. | 708/401 |
| 5,781,239 A | * | 7/1998 | Mattela | 348/415 |
| 5,818,532 A | * | 10/1998 | Malladi et al. | 375/240.03 |
| 5,867,601 A | * | 2/1999 | Phillips | 382/250 |
| 5,894,430 A | * | 4/1999 | Ohara | 364/725.03 |
| 5,903,312 A | * | 5/1999 | Malladi | 348/405 |

OTHER PUBLICATIONS

MacInnis, Alexander G. (Sandy); MPEG Systems Committee Draft ISO/IEC JTCI/SC2/WG11; IEEE; 1991; pp. 338–341.

Maturi, Gregg; Single Chip MPEG Audio Decoder; IEEE; Aug. 1992; pp. 348–356.

Systems Committee; International Organization for Standardization; Coding of Moving Pictures and Associated Audio; Sep. 1993; pp. 1–66.

\* cited by examiner

*Primary Examiner*—Young Lee
(74) *Attorney, Agent, or Firm*—Christopher P Maiorana, PC

(57) ABSTRACT

A system and method for performing an inverse discrete cosine transform (IDCT) based on DCT data is disclosed. The system is IEEE compliant and transforms one block (8×8) of pixels in 64 cycles. The IDCT processor receives the DCT input, produces the matrix $(QX^TQ)P$, or $X_QP$, in IDCT Stage 1 and stores the result in transpose RAM. IDCT Stage 2 performs the transpose of the result of IDCT Stage 1 and multiplies the result by P, completing the IDCT process and producing the IDCT output. The system performs the matrix function $QX^TQ$, where X represents the DCT data and Q is a predetermined diagonal matrix. The resultant value is adjusted by discarding selected bits, and the system then postmultiplies this with the elements of a predetermined P matrix, and discards selected bits. The system performs a conversion and storing function and performs a sign change to obtain $QX^TQP$. This completes first stage processing, which is then passed to transpose RAM. The system then initiates IDCT stage 2, and performs a matrix transpose of $QX^TQP$, yielding $(QX^TQP)^t$. The system converts and clips data, and postmultiplies the result by the P matrix. Another conversion is performed, a buffer addition performed, and a sign switch occurs to obtain the elements of $(QX^TQP)^tP$. The system then right shifts the data seven bits, with roundoff, and not a clipping, and then truncates the result to between −256 and 255.

20 Claims, 9 Drawing Sheets

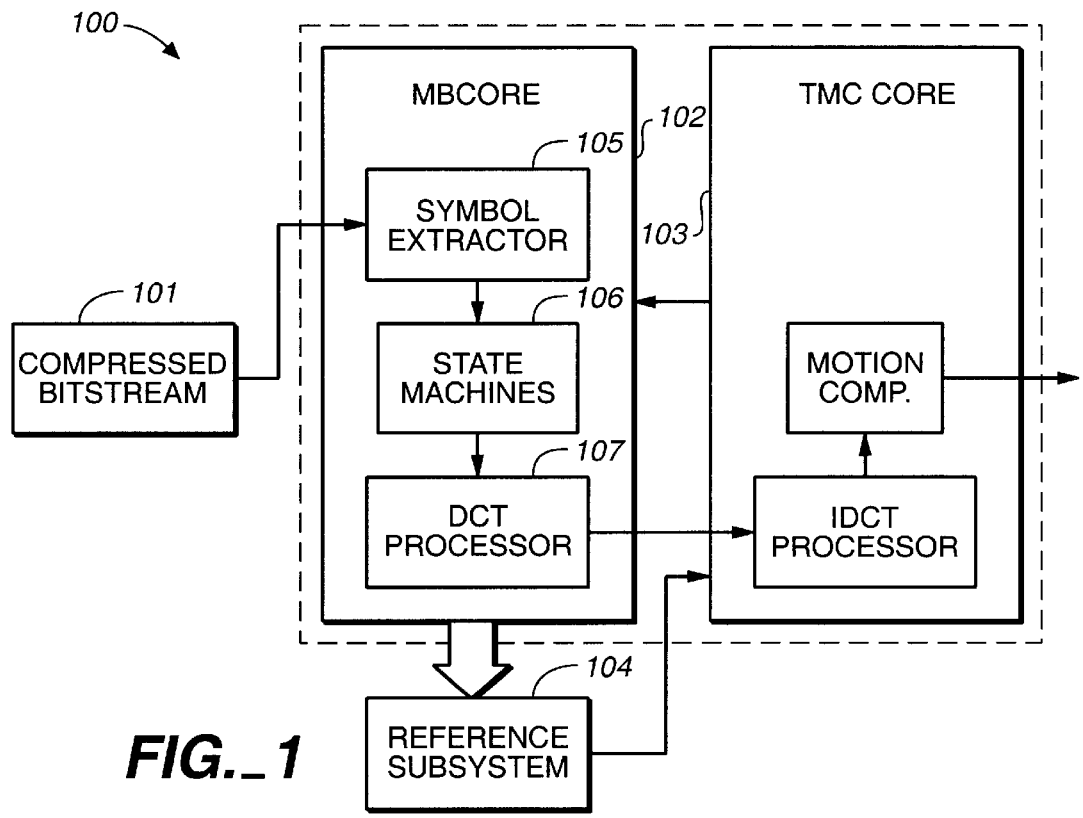
FIG._1
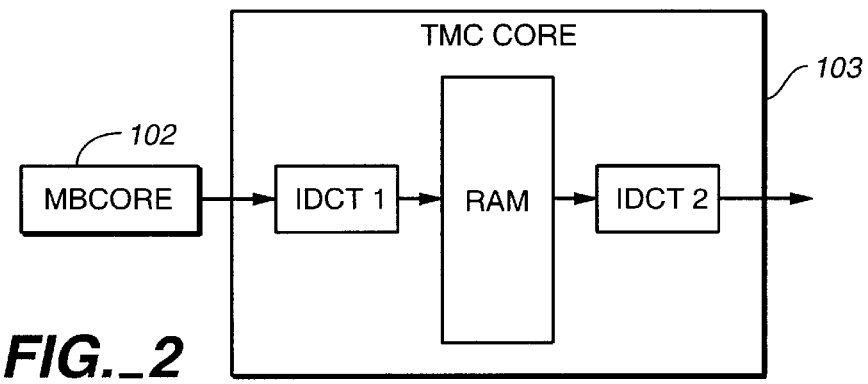
FIG._2

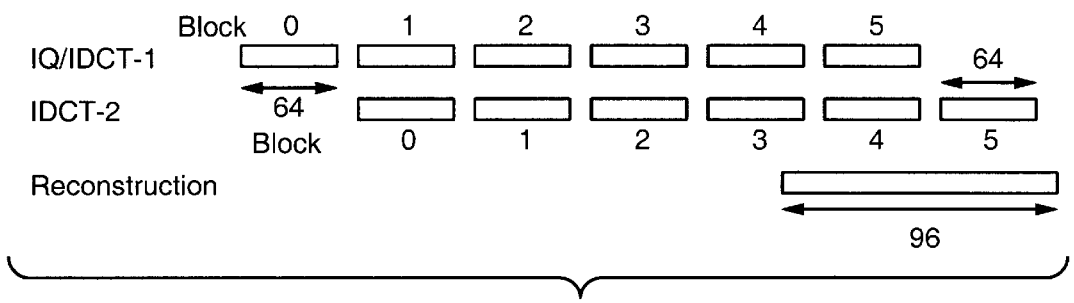
FIG._3
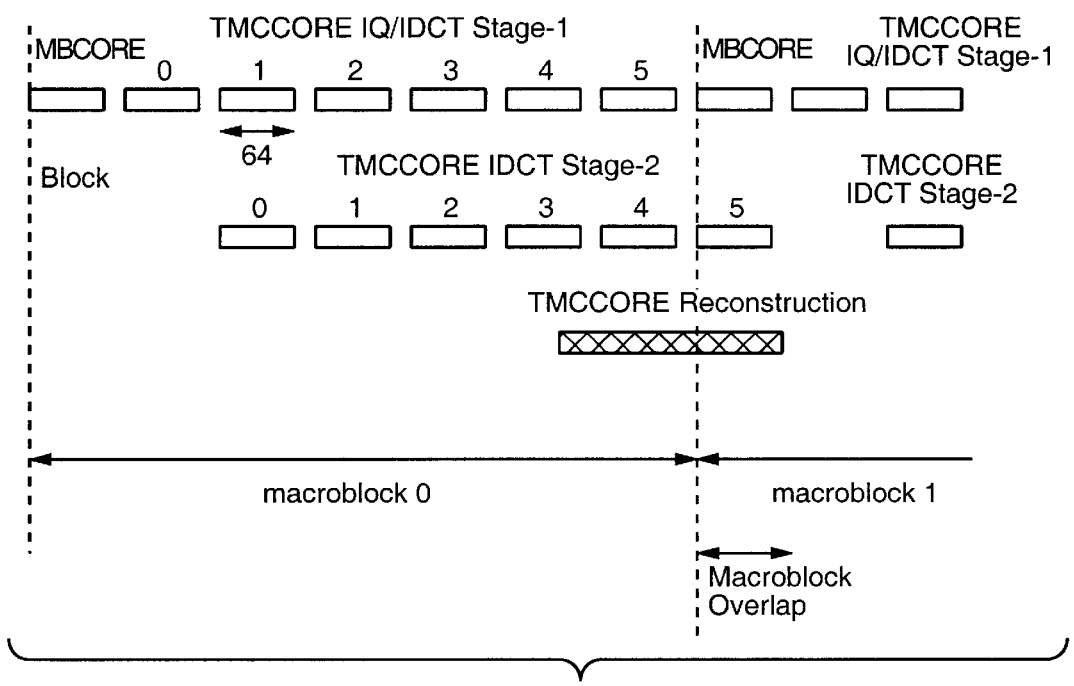
FIG._4

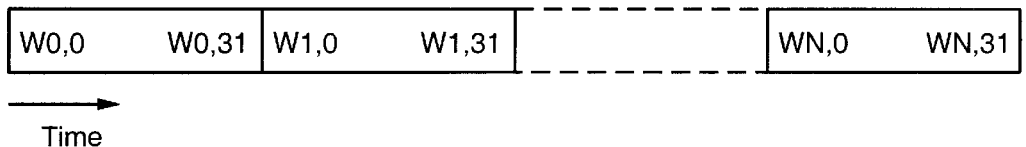
FIG._5A
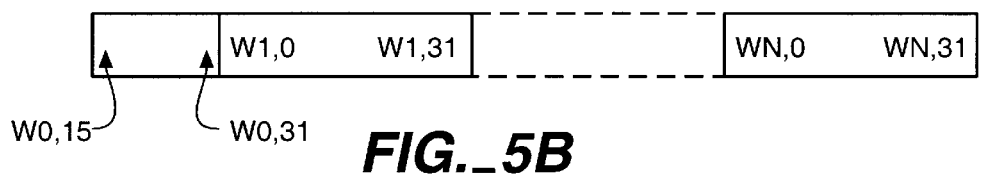
FIG._5B
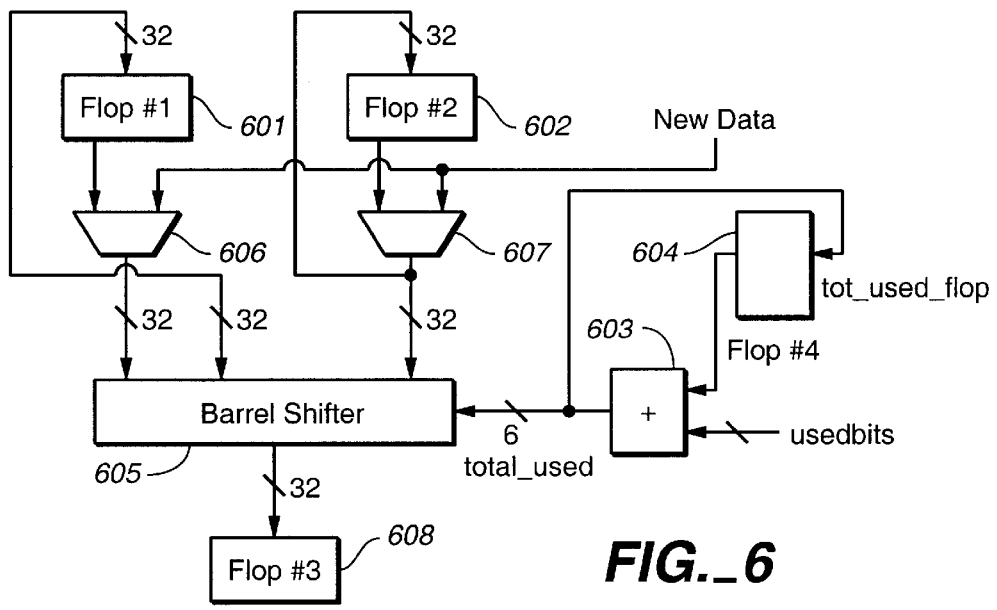
FIG._6

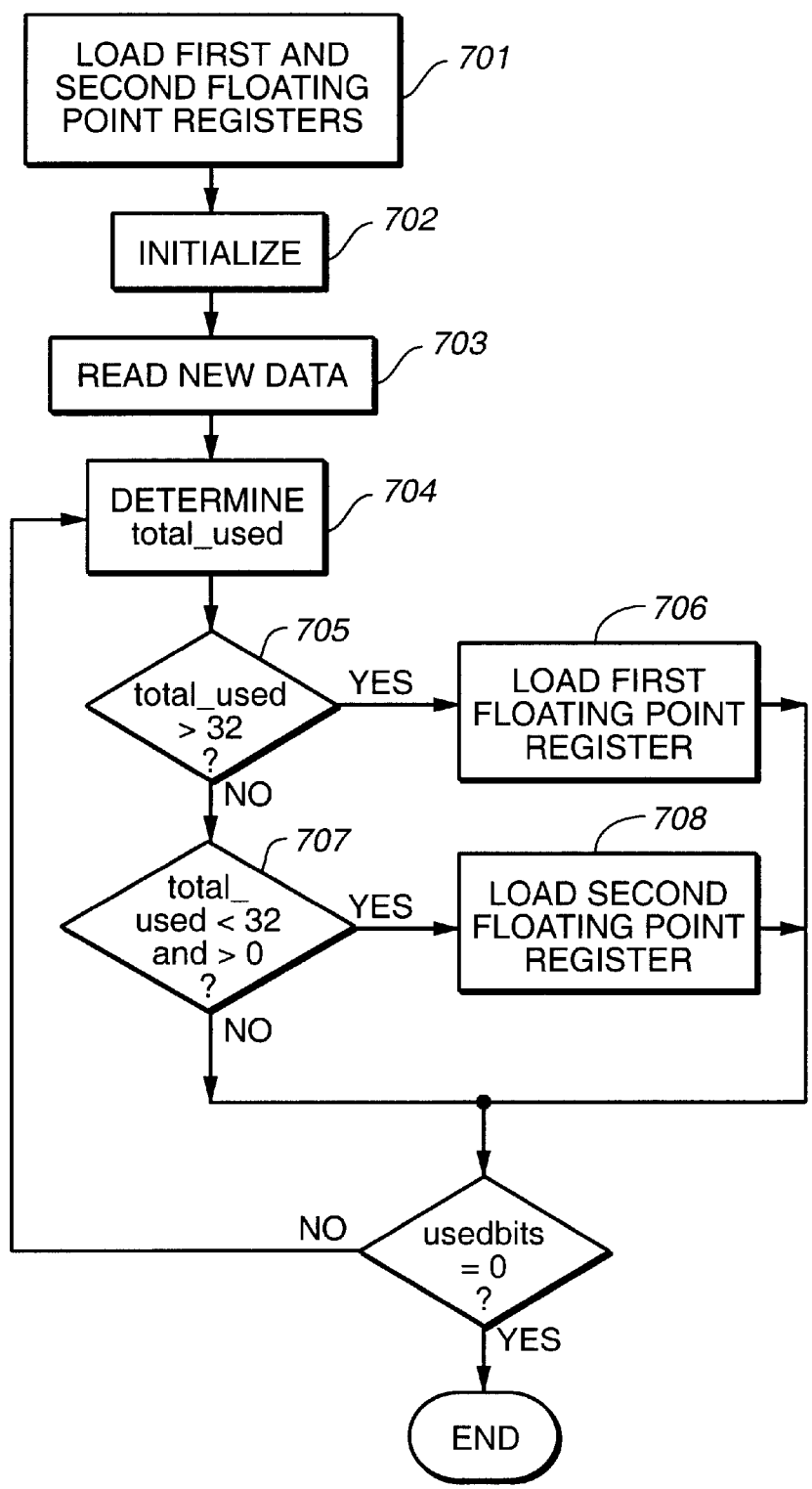
FIG._7

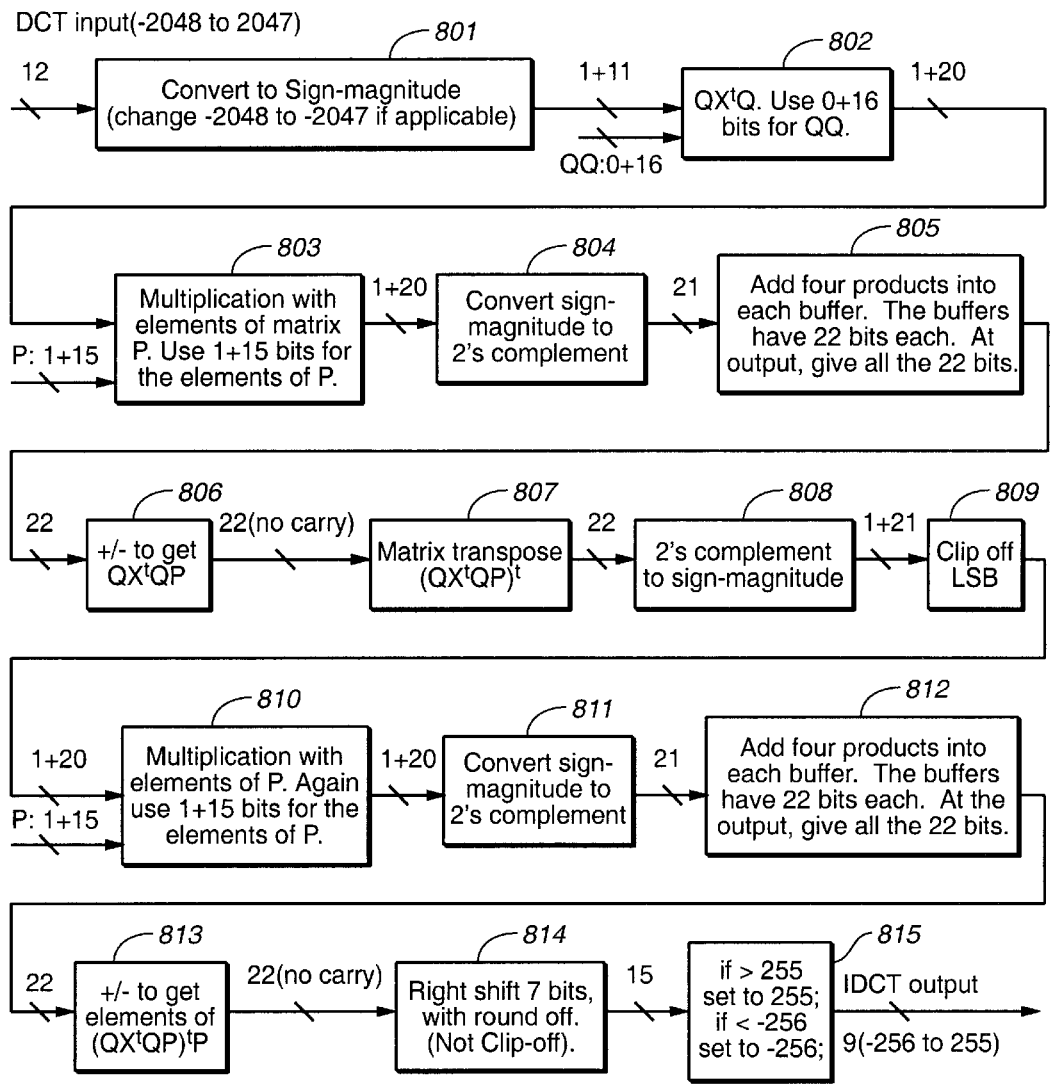
FIG._8

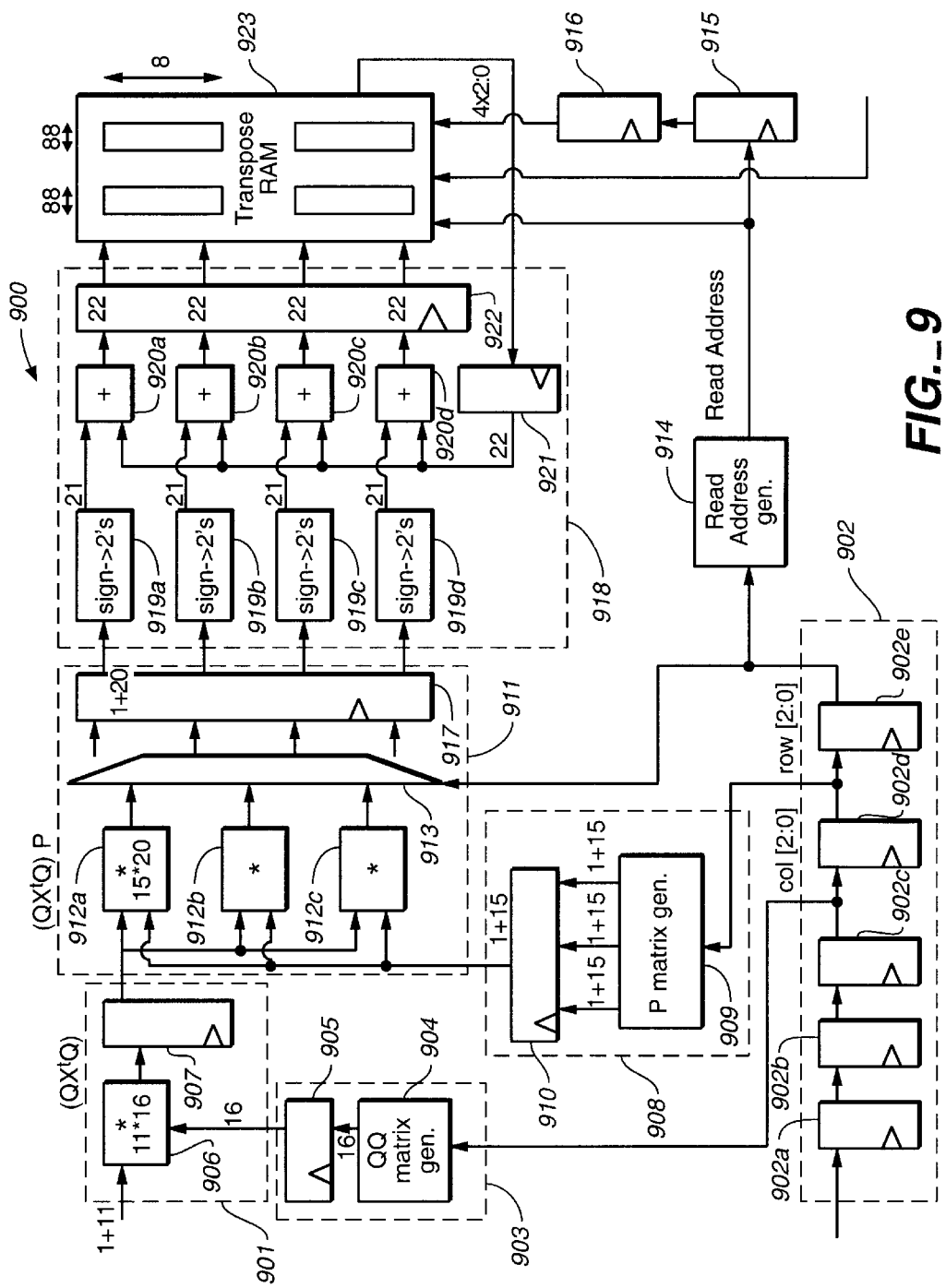
FIG._9

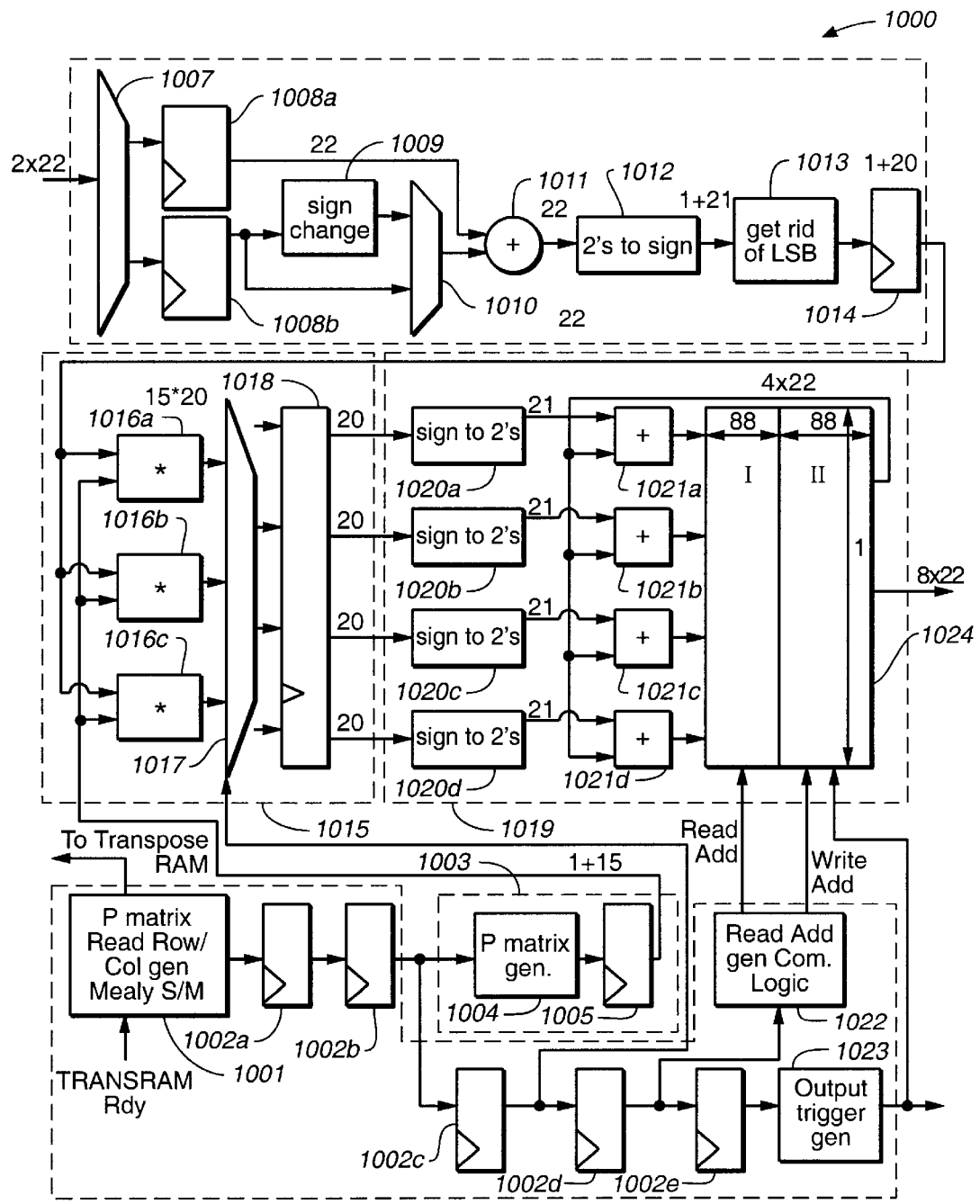
FIG._10

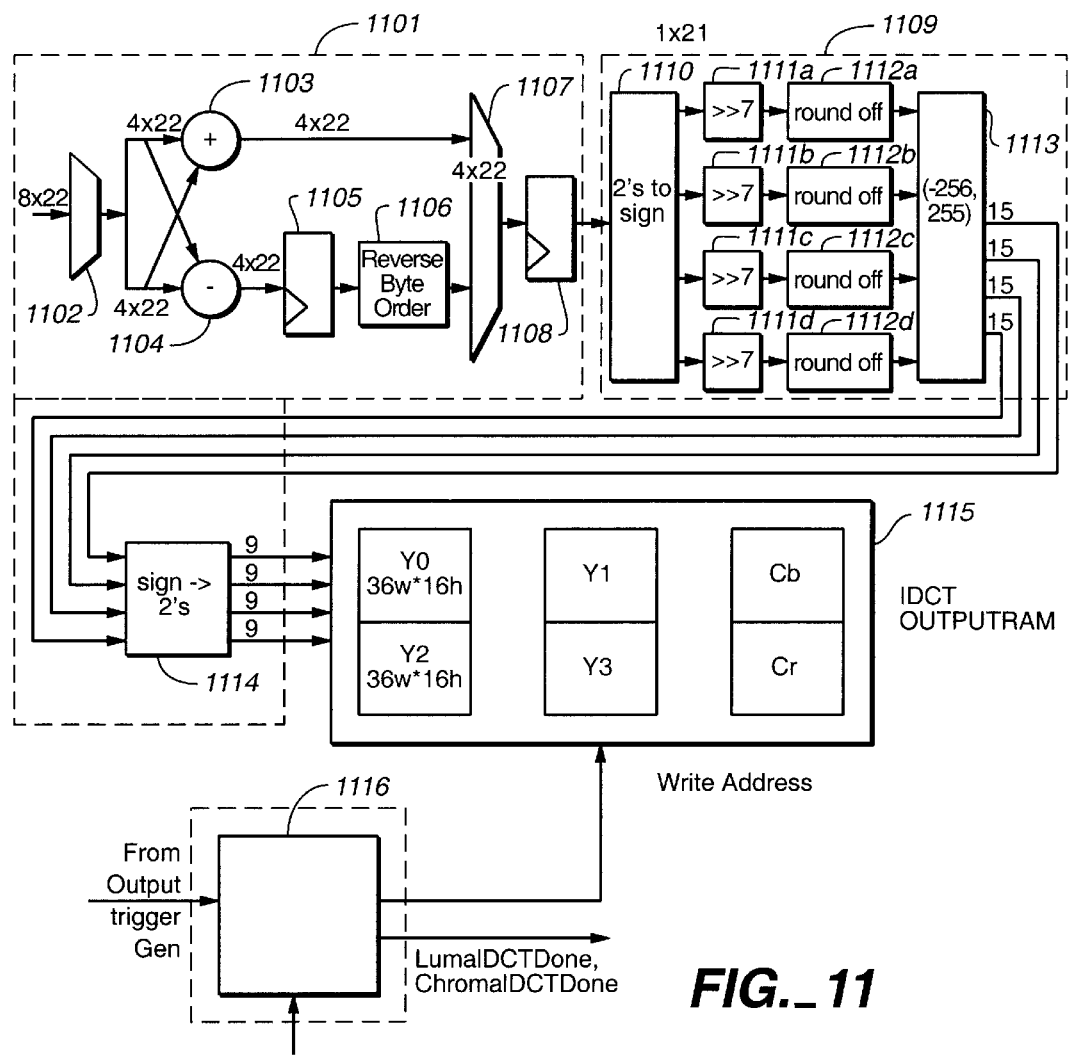
FIG._11
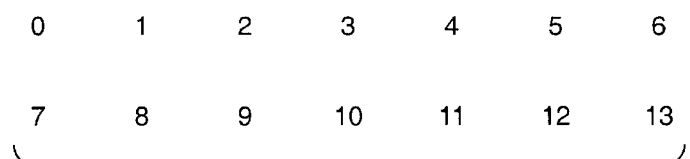
FIG._12

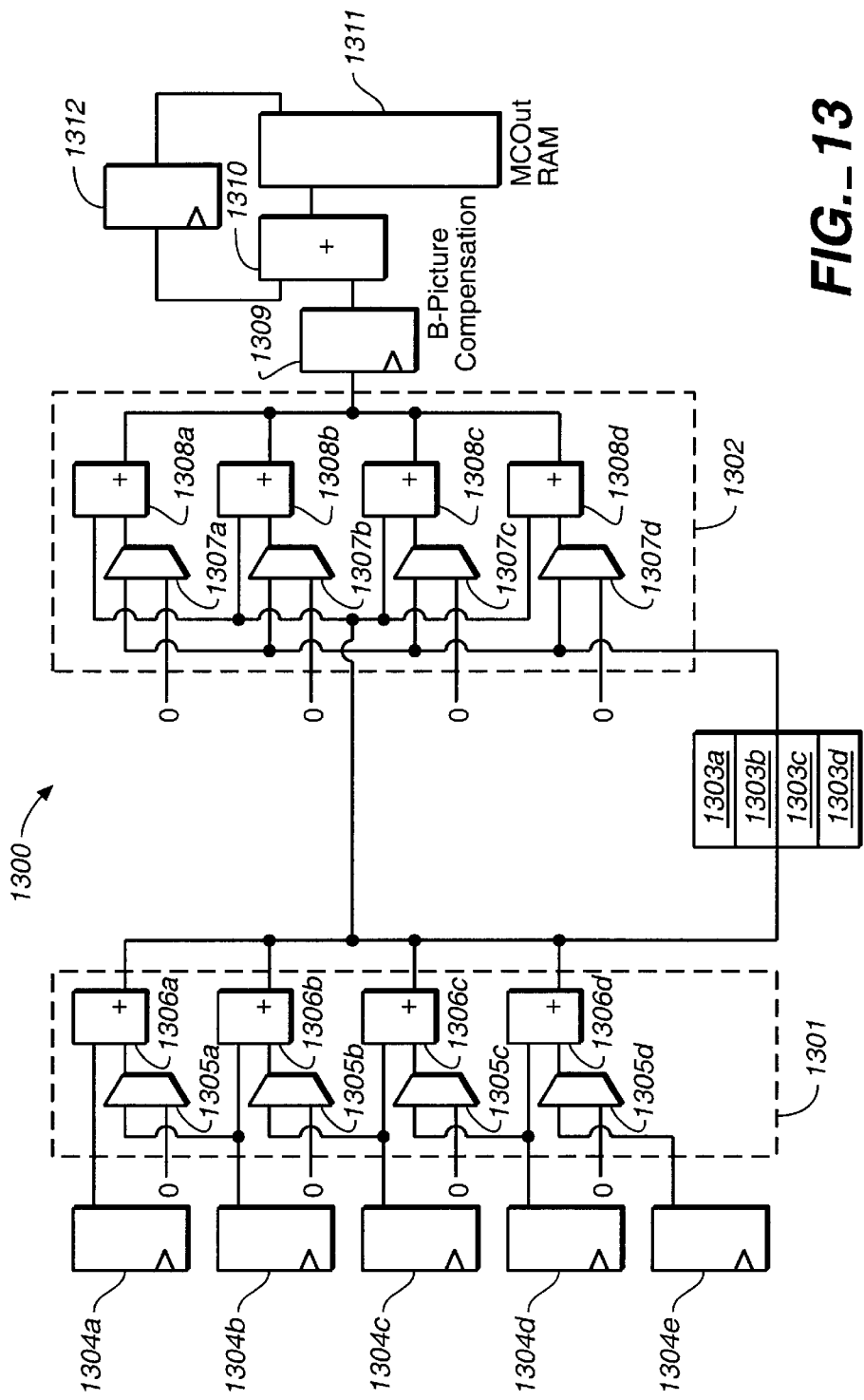
FIG._13

IDCT PROCESSOR FOR USE IN DECODING MPEG COMPLIANT VIDEO BITSTREAMS MEETING 2-FRAME AND LETTERBOXING REQUIREMENTS

CROSS-REFERENCE TO RELATED APPLICATIONS

This application is related to U.S. patent applications Ser. Nos. 08/904,084, 08/904,086, 08/904,088 and 08/903,809; all of the aforementioned applications were filed on Jul. 31, 1997 and are owned by LSI Logic Corporation.

BACKGROUND OF THE INVENTION

1. Field of the Invention

This invention relates generally to the field of multimedia systems, and more particularly to a video decoding device having the ability to meet particular predetermined transmission and display constraints. The video decoding device is particularly suited for Motion Picture Expert Group (MPEG) data compression and decompression standards.

2. Description of the Related Art

Multimedia software applications including motion pictures and other video modules employ MPEG standards in order to compress, transmit, receive, and decompress video data without appreciable loss. Several versions of MPEG currently exist or are being developed, with the current standard being MPEG-2. MPEG-2 video is a method for compressed representation of video sequences using a common coding syntax. MPEG-2 replaces MPEG-1 and enhances several aspects of MPEG-1. The MPEG-2 standard includes extensions to cover a wider range of applications, and includes the addition of syntax for more efficient coding of interlaced video and the occurrence of scalable extensions which permit dividing a continuous video signal into multiple coded bitstreams representing video at different resolutions, picture quality, or frame rates. The primary target application of MPEG-2 is the all-digital broadcast of TV quality video signals at coded bitrates between 4 and 9 Mbit/sec. MPEG-1 was optimized for CD-ROM or applications transmitted in the range of 1.5 Mbit/sec, and video was unitary and non-interlaced.

An encoded/compressed data stream may contain multiple encoded/compressed video and/or audio data packets or blocks. MPEG generally encodes or compresses video packets based on calculated efficient video frame or picture transmissions.

Three types of video frames are defined. An intra or I-frame is a frame of video data including information only about itself. Only one given uncompressed video frame can be encoded or compressed into a single I-frame of encoded or compressed video data.

A predictive or P-frame is a frame of video data encoded or compressed using motion compensated prediction from a past reference frame. A previous encoded or compressed frame, such as an I-frame or a P-frame, can be used when encoding or compressing an uncompressed frame of video data into a P-frame of encoded or compressed video data. A reference frame may be either an I-frame or a P-frame.

A bidirectional or B-frame is a frame of video data encoded or compressed using motion compensated prediction from a past and future reference frame. Alternately, the B-frame may use prediction from a past or a future frame of video data. B-frames are particularly useful when rapid motion occurs within an image across frames.

Motion compensation refers to the use of motion vectors from one frame to improve the efficiency for predicting pixel values of an adjacent frame or frames. Motion compensation is used for encoding/compression and decoding/decompression. The prediction method or algorithm uses motion vectors to provide offset values, error information, and other data referring to a previous or subsequent video frame.

The MPEG-2 standard requires encoded/compressed data to be encapsulated and communicated using data packets. The data stream is comprised of different layers, such as an ISO layer and a pack layer. In the ISO layer, packages are transmitted until the system achieves an ISO end code, where each package has a pack start code and pack data. For the pack layer, each package may be defined as having a pack start code, a system clock reference, a system header, and packets of data. The system clock reference represents the system reference time.

While the syntax for coding video information into a single MPEG-2 data stream are rigorously defined within the MPEG-2 specification, the mechanisms for decoding an MPEG-2 data stream are not. This decoder design is left to the designer, with the MPEG-2 spec merely providing the results which must be achieved by such decoding.

Devices employing MPEG-1 or MPEG-2 standards consist of combination transmitter/encoders or receiver/decoders, as well as individual encoders or decoders. The restrictions and inherent problems associated with decoding an encoded signal and transmitting the decoded signal to a viewing device, such as a CRT or HDTV screen indicate that design and realization of an MPEG-compliant decoding device is more complex than that of an encoding device. Generally speaking, once a decoding device is designed which operates under a particular set of constraints, a designer can prepare an encoder which encodes signals at the required constraints, said signals being compliant with the decoder. This disclosure primarily addresses the design of an MPEG compliant decoder.

Various devices employing MPEG-2 standards are available today. Particular aspects of known available decoders will be described.

Frame Storage Architecture

Previous systems used either three or two and a half frame storage for storage in memory.

Frame storage works as follows. In order to enable the decoding of B-frames, two frames worth of memory must be available to store the backward and forward anchor frames. Most systems stored either a three frame or two and a half frames to enable B-frame prediction. While the availability of multiple frames was advantageous (more information yields an enhanced prediction capability), but such a requirement tends to require a larger storage buffer and takes more time to perform prediction functions. A reduction in the size of memory chips enables additional functions to be incorporated on the board, such as basic or enhanced graphic elements, or channel decoding capability. These elements also may require memory access, so incorporating more memory on a fixed surface space is highly desirable. Similarly, incorporating functional elements requiring smaller memory space on a chip is also beneficial.

Scaling

The MPEG-2 standard coincides with the traditional television screen size used today, thus requiring transmission having dimensions of 720 pixels (pels) by 480 pixels. The television displays every other line of pixels in a raster scan The typical television screen interlaces lines of pels, sequentially transmitting every other line of 720 pels (a total of 240 lines) and then sequentially transmitting the remaining 240 lines of pels. The raster scan transmits the full frame at 1/30 second, and thus each half-frame is transmitted at 1/60 second.

For MPEG storage method of storing two and a half frames for prediction relates to this interlacing design. The two and a half frame store architecture stores two anchor frames (either I or P) and one half of a decoded B frame. A frame picture is made up of a top and a bottom field, where each field represents interlaced rows of pixel data. For example, the top field may comprise the first, third, fifth, and so forth lines of data, while the bottom field comprises the second forth, sixth, and so on lines of data. When B frames are decoded, one half the picture (either the top field or the bottom field) is displayed. The other half picture must be stored for display at a later time. This additional data accounts for the "half frame" in the two and a half frame store architecture.

In a two frame store architecture, there is no storage for the second set of interlaced lines that has been decoded in a B-frame. Therefore, an MPEG decoder that supports a two frame architecture must support the capability to decode the same picture twice in the amount of time it takes to display one picture. As there is no place to store decoded B-frame data, the output of the MPEG decoder must be displayed in real time. Thus the MPEG decoder must have the ability to decode fast enough to display a field worth of data.

A problem arises when the picture to be displayed is in what is called the "letterbox" format. The letterbox format is longer and narrower than the traditional format, at an approximately 16:9 ratio. Other dimensions are used, but 16:9 is most common. The problem with letterboxing is that the image is decreased when displayed on screen, but picture quality must remain high. The 16:9 ratio on the 720 by 480 pel screen requires picture on only ¾ of the screen, while the remaining ¼ screen is left blank. In order to support a two-frame architecture with a letterboxing display which takes ¾ of the screen, a B-frame must be decoded in ¾ the time taken to display a field of data.

The requirements to perform a two frame store rather than a two and a half or three frame store coupled with the desire to provide letterbox imaging are significant constraints on system speed which have not heretofore been achieved by MPEG decoders.

It is therefore an object of the current invention to provide an MPEG decoding system which operates at 54 Mhz and sufficiently decodes an MPEG data stream while maintaining sufficient picture quality.

It is a further object of the current invention to provide an MPEG decoder which supports two frame storage.

It is another object of the current invention to provide a memory storage arrangement that minimizes on-chip space requirements and permits additional memory and/or functions to be located on the chip surface. A common memory area used by multiple functional elements is a further objective of this invention.

It is yet another object of the current invention to provide an MPEG decoder which supports signals transmitted for letterbox format.

SUMMARY OF THE INVENTION

According to the current invention, there is provided a system and method for performing an inverse discrete cosine transform (IDCT) calculation based on DCT data. The system is IEEE compliant and transforms one block (8×8) of pixels in 64 cycles.

The system is a part of a larger system which comprises a macroblock core (MBCORE) and a transformation/motion compensation core (TMCCORE). The IDCT processor is a part of the TMCCORE. The TMCCORE receives the DCT input, produces the matrix $(QX^tQ)P$, or $X_QP$, in IDCT Stage 1 and stores the result in transpose RAM. IDCT Stage 2 performs the transpose of the result of IDCT Stage 1 and multiplies the result by P, completing the IDCT process and producing the IDCT output.

The IDCT processor receives 12 bits of DCT data input which ranges with the sign bit from −2048 to +2047. The system performs a sign change to convert to sign magnitude. If necessary, the system changes −2048 to −2047, yielding eleven bits of data and a data bit indicating sign. The system performs the matrix function $QX^tQ$, where X represents the DCT data and Q is a predetermined diagonal matrix. The resultant value is adjusted by discarding selected bits, and the system then postmultiplies this with the elements of a predetermined P matrix, and discards selected bits.

The system converts the sign magnitude to two's complement. The system adds four blocks into each buffer, with the buffers having 22 bits each. A sign change is performed to obtain $QX^tQP$. This completes first stage processing, which is then passed to transpose RAM.

The system then initiates IDCT stage 2, and performs a matrix transpose of $QX^tQP$, yielding $(QX^tQP)^t$. The system then performs a twos complement to sign-magnitude, clips the least significant bit, and postmultiplies the result by the P matrix. The system then sign-magnitude converts this value back to 2's complement, and adds four products into each buffer, and performs a sign switch to obtain the elements of $(QX^tQP)^tP$. The system then right shifts the data seven bits, with roundoff, and not a clipping, and then truncates the result to between −256 and 255.

Other objects, features, and advantages of the present invention will become more apparent from a consideration of the following detailed description and from the accompanying drawings.

DESCRIPTION OF THE DRAWINGS

FIG. 1 illustrates the MPEG video decoder 100 according to the current invention;

FIG. 2 is a detailed illustration of the TMCCORE in accordance with the current invention;

FIG. 3 presents the timing diagram for the transmission of data through the TMCCORE;

FIG. 4 shows the staggered timing of data transmission through the TMCCORE;

FIG. 5A illustrates the data blocks received by the MBCORE;

FIG. 5B shows the data blocks received by the MBCORE after 16 bits of data have been transmitted to the system;

FIG. 6 shows the hardware implementation of the Data Steering Logic;

FIG. 7 is a flowchart illustrating operation of the Data Steering Logic;

FIG. 8 is a flowchart of the DCT processor multiplication logic;

FIG. 9 illustrates the implementation of IDCT Stage 1 which functionally calculates $X_QP$;

FIG. 10 is the design for IDCT stage 2, which transposes the result from IDCT Stage 1 and multiplies the resultant matrix by P;

FIG. 11 shows the system design for performing the final functions necessary for IDCT output and storing the values in appropriate positions in IDCT OUTPUT RAM;

FIG. 12 represents the numbering of pels for use in motion compensation; and

FIG. 13 is the mechanization of the motion compensation unit used to satisfy two frame store and letterboxing requirements.

DETAILED DESCRIPTION OF THE INVENTION

The requirements for supporting a two frame architecture as well as letterbox scaling are as follows, using NTSC. Letterbox scaling only transmits ¾ of a full screen, leaving the top and bottom eighth of the screen blank at all times. For letterbox scaling, a total of 360 (or ¾*480) lines of active video must be displayed. For a two frame store system, with a 45 by 30 macroblock picture, 360 lines of active video divided by 30*525 seconds is available, or approximately 0.02286 seconds are available to decode the 45 by 30 macroblock arrangement. With 30 rows of macroblocks, the time to decode one full row of macroblocks is (360/(30*525))/30 seconds, or approximately 761.91 microseconds. The time to decode one macroblock is 761.91/45 or 16.391 microseconds. With two frame store, double decoding is necessary, and the time available to decode a macroblock is 16.391/2 microseconds, or 8.465 microseconds.

Decoder Architecture

FIG. 1 illustrates the MPEG video decoder 100 according to the current invention. The system passes the compressed bitstream 101 to MBCORE 102 (Macro Block core), which passes data to TMCCORE 103 (Transformation/Motion Compensation core) and Reference Subsystem 104. TMCCORE 103 passes information to MBCORE 102, and produces reconstructed macroblocks.

The MBCORE 102 operates as both a controller and a parser. The MBCORE 102 primary function is to parse the compressed bitstream 101 and generate DCT coefficients and motion vectors for all macroblocks. The DCT coefficients then pass to the TMCCORE 103 for further processing, and the MBCORE 102 passes the motion vectors to the Reference Subsystem 104 for further processing.

The MBCORE 102 comprises video bitstream symbol extractor 105 and state machines 106. MBCORE 102 reads the compressed bitstream 101 and if the compressed bitstream is in VLC (Variable Length Coding), the MBCORE decompresses the bitstream using the video bitstream symbol extractor 105, detailed below. The MBCORE further comprises DCT processor 107, which enables the MBCORE 102 to calculate and provide DCT coefficients to the TMCCORE 103 and motion vectors to the Reference Subsystem 104.

The TMCCORE 103 receives DCT and motion vector information for a series of macroblocks and performs the inverse discrete cosine transfer for all data received. The TMCCORE 103 receives the discrete cosine transfer data from the MBCORE 102, computes the inverse discrete cosine transform (IDCT) for each macroblock of data, computes a motion vector difference between the current frame and the reference frame by essentially "backing out" the difference between the current frame and reference frame, and combines this motion vector difference with the IDCT coefficients to produce the new frame using motion compensation. The TMCCORE 103 also executes pel compensation on reference data received from the Reference Subsystem 104, and reconstructs the new frame using information from the Reference Subsystem 104 and the MBCORE 102.

The Reference Subsystem 104 receives motion vectors from the MBCORE 102. The Reference Subsystem 104 determines the location of necessary motion related information, such as previous frame data and current frame data, to support the TMCCORE 103 in compensation and reconstruction. The Reference Subsystem 104 acquires such information and provides it to the TMCCORE 103.

As noted above, the timing for performing the necessary parsing, coefficient generation, transmission, and picture reconstruction functions is critical. Data is transmitted to the MBCORE 102 as follows: a slice header and macroblock data passes to the MBCORE 102, followed by the DCT coefficient data for a particular macroblock of data. The slice header and macroblock data take 30 cycles for transmission, and thus the MBCORE does not transmit DCT data for 30 cycles. Transmission of one macroblock of data requires the initial 30 cycle period, followed by six 64 cycle transmissions, and then the procedure repeats.

The MBCORE 102 takes 50 cycles to parse the video bitstream from the slice start code, i.e. a data block indicating the beginning of a particular bitstream arrangement, to generating the first coefficients for the IQ stage of the TMCCORE 103.

Operation of the MBCORE is as follows. The MBCORE initially accepts and parses the 50 cycles up to the block layer. The MBCORE then generates one DCT coefficient per cycle, and takes a total of (64+1)*5+64 cycles, or 389 cycles, to generate all the DCT coefficients for a given macroblock. The MBCORE passes a total of 384 DCT coefficients (64*6) to the TMCCORE 103, which accepts one block of coefficient data into IDCT Stage 1.

A detailed illustration of the TMCCORE is presented in FIG. 2. After a full block of IDCT coefficient data passes through the IDCT Stage 1 data path, which can conceptually be analogized to a pipeline, IDCT Stage 2 computation begins on the IDCT Stage 1 processed data. Hence IDCT Stage 1 data is stored by the system in RAM and the IDCT Stage 1 data is subsequently received by IDCT Stage 2 within the TMCCORE 103. IDCT Stage 1 operates as soon as it receives the data from the MBCORE 102. IDCT Stage 2, however, is one block delayed due to the processing, storage, and retrieval of the IDCT data. The arrangement of the timing of the IDCT stages and the transmission of data within the TMCCORE 103 are presented below.

Data Transmission Method

FIG. 3 presents the timing diagram for the transmission of data through the TMCCORE 103. From FIG. 3, the zero block of data, comprising 64 units of data and taking 64 cycles, is processed in the IQ/IDCT Stage 1 pipeline initially. A gap occurs between the six 64 blocks of data, taking one cycle. The one block of data is subsequently processed by the IQ/IDCT Stage 1 pipeline at the time the IDCT Stage 2 processes the zero block data. Processing continues in a staggered manner until the four block is processed in IDCT Stage 1 and the three block in IDCT Stage 2, at which time the system begins reconstruction of the picture.

With the 4:2:0 ratio, the TMCCORE 103 receives four luminance pixels and two chrominance pixels. At the end of the four luminance pixels, the TMCCORE 103 initiates reconstruction of the picture.

Total time for the process is 64 cycles multiplied by 6 blocks=384 cycles, plus five one cycle gaps, plus the 35 cycles for header processing, plus a trailing five cycles to complete reconstruction, for a total of 429 cycles. Reconstruction takes 96 cycles.

The staggered timing arrangement for processing the data permits the functions of the MBCORE 102 and TMCCORE 103 to overlap. This overlap permits the MBCORE 102 to operate on one macroblock of data while the TMCCORE 103 operates on a second macroblock. Prior systems required full loading of a single macroblock of data before processing the data, which necessarily slowed the system down and would not permit two-frame store and letterbox scaling.

FIG. 4 shows the MBCORE/TMCCORE macroblock decoding overlap scheme. Again, header data is received by the MBCORE 102, followed by zero block data, which are passed to IQ/IDCT Stage 1 processing. TMCCORE IDCT Stage 2 subsequently processes the zero block data, at the same time IQ/IDCT Stage 1 processes one block data. The staggered processing progresses into and through the reconstruction stage. During reconstruction, the five block is received and processed in IDCT Stage 2, at which time the MBCORE begins receipt of data from the subsequent macroblock. Five block and picture reconstruction completes, at which time zero block for the subsequent macroblock is commencing processing within IQ/IDCT Stage 1. This is the beneficial effect of overlapping processing.

In order to perform full merged store processing, wherein the IDCT data and the motion vector data is merged within the TMCCORE 103, both sets of data must be synchronized during reconstruction. From the drawing of FIG. 4, the motion vector data is received at the same time the IDCT Stage 2 data is received and processed. The sum of the IDCT Stage 2 data and the motion vector data establishes the picture during reconstruction, and that picture is then transmitted from the TMCCORE 103.

The total number of cycles required to decode the video bitstream from the slice header and ship out six blocks of coefficients is 429 cycles. The TMCCORE IDCT Stage 2 and Reconstruction takes fewer cycles than the MBCORE parsing and shipping of data. With the staggered processing arrangement illustrated above, the MPEG video processor illustrated here can decode the bitstream in 429 cycles (worst case).

From the requirements outlined above for the letterbox format and two frame store, the minimum frequency at which the MBCORE 102 and the TMCCORE 103 must operate at to achieve real time video bitstream decoding is 1/8.465 microseconds/429 cycles, or 50.67 Mhz. Thus by overlapping the decoding of the macroblocks using the invention disclosed herein, the MBCORE and the TMCCORE together can perform MPEG-2 MP/ML decoding with a two frame store architecture and letterbox decoding with a clock running at 54 Mhz.

Video Bitstream Symbol Extractor/Data Steering Logic

The decoder of FIG. 1 must have the ability to decode a VLD (variable length DCT) in every clock cycle. The MBCORE 102 receives one DCT coefficient per cycle, and comprises in addition to an inverse DCT function a video bitstream symbol extractor 105. Data in the bitstream is compressed, and thus the MBCORE 102 must extract the necessary symbols from the bitstream, which may vary in size. The largest symbol which must be extracted is 32 bits according to the MPEG standard. The data steering logic for the video bitstream symbol extractor permits enables the MBCORE 102 to read the symbols irrespective of symbol size.

The MBCORE 102 receives compressed video data in a linear fashion as illustrated in FIG. 5A. W0,0 represents Word 0, bit 0, while W1,31 represents Word 1, bit 31, and so forth. Time progresses from left to right, and thus the data bitstream enters the video decoder from left to right in a sequential manner as illustrated in FIG. 5A. As parsing is performed, compressed data consumed by the system is flushed out of the register and new data is shifted into the register. This flushing of consumed data and maintenance of unconsumed data is performed by the data steering logic.

FIG. 5B illustrates the appearance of the data after a 16 bit symbol is consumed . The data comprising W0,0 . . . 15 is consumed by the system, leaving all other data behind. The problem which arises is that upon consuming a 16 bit symbol, the next symbol may be 30 bits in length, thereby requiring excess storage beyond the 32 bit single word length. The tradeoff between timing and space taken by performing this shifting function is addressed by the data steering logic.

Data steering logic is presented in FIG. 6. According to the data steering logic, the CPU first instructs the data steering logic to initiate data steering. Upon receiving this initiation signal, the data steering logic loads 32 bit first flop 601 and 32 bit second flop 602 with 64 bits of data. The data steering logic then resets the total_used_bits counter 603 to zero and indicates that initialization is complete by issuing an initialization ready signal to the CPU.

Once the MBCORE 102 begins receiving video data, state machines 106 within the MBCORE 102 examine the value coming across the data bus and consume some of the bits. This value is called "usedbits" and is a six bit ([5:0]) bus. The total number of used bits, total_used[5:0], is the sum of total_used_bits[5:0] and usedbits[5:0]. total_used_bits are illustrated in FIG. 6 as flop 604. Bit usage via flop 604 and total_used_bits counter 603 is a side loop used to track the status of the other flops and barrel shifter 605.

Data is sequentially read by the system and passed to the barrel shifter, and subsequently passed to resultant data flop 608.

For example, the initial value of usedbits is 0. A consumption of 10 bits, representing a 10 bit symbol, by the state machines 106 yields a total_used_bits of 10. Hence the total_used is 10. These 10 bits are processed using first flop bank MUX 606 and loaded into barrel shifter 605.

total_used is a six bit wide bus. The range of values that may be stored using total_used is from 0 to 63. When the value of total_used_bits is greater than 63, the value of total_used_bits wraps back around to zero.

When total_used is greater than 32 and less than or equal to 63, first flop bank 601 is loaded with new data. When total_used is greater than or equal to zero and less than 32, the data steering logic loads second flop bank 602 with data.

Continuing with the previous example, the first 10 bit symbol is processed by first flop bank MUX 606 and loaded into barrel shifter 605, usedbits set to 10, total_used set to 10, and total_bits_used set to 10. The next symbol may take 12 bits, in which case the system processes the 12 bit symbol using first flop bank MUX 606 and passes the data to barrel shifter 605. usedbits is set to 12, which is added to total_used_bits (10) in total_used_bits counter 603, yielding a total_used of 22.

The next data acquired from RAM may be a large symbol, having 32 bits of length. Such a symbol spans both first flop 601 and second flop 602, from location 23 in first flop 601 through second flop 602 location 13. In such a situation, usedbits is 32, and the data is processed by first flop bank MUX 606 and second flop bank MUX 607. usedbits is set to 32, which is added to total_used bits (22) in total_used_bits counter 603, yielding a total_used of 54.

With a total_used of 54, the system loads new data into first flop 601 and continues with second flop 602.

Barrel shifter 605 is a 32 bit register, and thus the addition of the last 32 bit segment of processed data would fill the barrel shifter 605. Hence the data from barrel shifter 605 is transferred out of barrel shifter 605 and into resultant data flop 608. The 32 bits from first flop bank MUX 606 and second flop bank MUX 607 pass to barrel shifter 605.

Continuing with the example, the next symbol may only take up one bit. In such a situation, used bits is one, which is added to total_used_bits (54) yielding a total_used of 55. The system processes the bit in second flop bank MUX 607 and the processed bit passes to barrel shifter 605.

The next symbol may again be 32 in length, in which case data from the end of second flop 602 and the beginning of first flop 601 is processed and passed into the barrel shifter 605. usedbits is 32, which is added to total_used_bits (54), which sums to 87. However, the six bit size of the total_used indicates a total of 23, i.e. the pointer in the barrel register 605 is beyond the current 64 bits of data and is 23 bits into the next 64 bits of data.

With a value in excess of 32 bits, the single bit residing in barrel shifter 605 passes to resultant data flop 608, and the 32 bits pass to barrel shifter 605. The system then sequentially steps through all remaining data to process and pass data in an efficient manner.

The operation of the process is illustrated graphically in FIG. 7. The first and second flop banks are loaded in step 701 and the system initialized in step 702. The system reads data in step 703 and determines total_used in step 704. The system then determines whether total_used_bits is greater than 32 in step 705, and, if so, first flop bank is loaded with new data in step 706. Step 707 determines whether total_used is greater than or equal to 0 and less than 32. If so, step 708 loads the second flop bank with data.

As long as usedbits is not equal to zero, steps 704 through 708 are repeated. If the CPU initializes the data steering logic in the middle of the operation, the process begins at step 701.

The advantage of this implementation is that it is hardware oriented and requires no interaction from a CPU or microcontroller. Only a single shift register is used, which provides significant area savings. The system obtains the benefits of using the shift register as a circular buffer in that the system uses total bits as a pointer into the shift register and loads shifted data into the resultant data register 608.

IDCT Processor/Algorithm

The TMCCORE 103 performs the IDCT transform using IDCT processor 107. The Inverse Discrete Cosine Transform is a basic tool used in signal processing. The IDCT processor 107 used in MBCORE 102 may be any form of general purpose tool which performs the IDCT function, but the preferred embodiment of such a design is presented in this section.

The application of the IDCT function described in this section is within a real time, high throughput multimedia digital signal processing chip, but alternate implementations can employ the features and functions presented herein to perform the inverse DCT function.

The implementation disclosed herein is IEEE compliant, and conforms with IEEE Draft Standard Specification for the Implementations of 8×8 Inverse Discrete Cosine Transform, P1180/D1, the entirety of which is incorporated herein by reference.

Generally, as illustrated in FIG. 1, the MBCORE 102 receives DCT data and initially processes symbols using the video bitstream symbol extractor 105 and subsequently performs the IDCT function using IDCT processor 107.

The system feeds DCT coefficients into IDCT processor 106 in a group of eight rows of eight columns. Each DCT coefficient is a 12 bit sign magnitude number with the most significant bit (MSB) being the sign bit. The IDCT processor 106 processes a macroblock comprising an 8×8 block of pixels in 64 cycles. After processing, the IDCT processor transmits a data stream of eight by eight blocks. Each output IDCT coefficient is a nine bit sign magnitude number also having the MSB as a sign bit.

The Inverse Discrete Cosine Transform is defined as:

$$x(i,j) = \frac{1}{4}\sum_{k=0}^{7}\sum_{l=0}^{7} C(k)C(l)X(k,l)\cos\left(\frac{(2i+1)k\pi}{16}\right)\cos\left(\frac{(2j+1)l\pi}{16}\right) \quad (1)$$

where i,j=0 ... 7 is the pixel value, X(k,l), k,l=0 ... 7 is the transformed DCT coefficient, x(i,j) is the final result, and $$C(0) = \frac{1}{\sqrt{2}}, \text{ and } C(i) = 1, i = 1, \ldots 7 \quad (2)$$

Equation 1 is mathematically equivalent to the following matrix form:

$$x = \frac{1}{4}(X_Q P)^t P \quad (3)$$

where $X_Q(i,j)=QQ(i,j)\times(j,i)$, $QQ=Q^*Q$, where Q is a matrix and QQ is the product of matrix Q with itself. P from Equation 3 is as follows:

$$P = \begin{bmatrix} 1 & 1 & 1 & 1 & 1 & 1 & 1 & 1 \\ a & r(a+1) & r(a-1) & 1 & -1 & -r(a-1) & -r(a+1) & -a \\ b & 1 & -1 & -b & -b & -1 & 1 & b \\ c & -r(c-1) & -r(c+1) & -1 & 1 & r(c+1) & r(c-1) & -c \\ 1 & -1 & -1 & 1 & 1 & -1 & -1 & 1 \\ 1 & -r(c+1) & r(c-1) & c & -c & -r(c-1) & r(c+1) & -1 \\ 1 & -b & b & -1 & -1 & b & -b & 1 \\ 1 & -r(a-1) & r(a+1) & -a & a & -r(a+1) & r(a-1) & -1 \end{bmatrix}$$

where Q is:

$$Q = I * \begin{bmatrix} \dfrac{1}{\sqrt{2}} & \dfrac{1}{\sqrt{a^2+1}} & \dfrac{1}{\sqrt{b^2+1}} & \dfrac{1}{\sqrt{c^2+1}} & \dfrac{1}{\sqrt{2}} & \dfrac{1}{\sqrt{c^2+1}} & \dfrac{1}{\sqrt{b^2+1}} & \dfrac{1}{\sqrt{a^2+1}} \end{bmatrix}$$

and I is a unitary diagonal identity matrix, a is 5.0273, b is 2.4142, c is 1.4966, and r is 0.7071.

The matrix representation of the IDCT greatly simplifies the operation of the IDCT processor 106, since each row of the P matrix has only four distinct entries, with one entry being 1. This simplification of the number of elements in the IDCT matrix means that in performing a matrix multiplication, the system only needs three multipliers instead of eight, the total number of elements in each row.

The system performs IDCT processing by performing multiplications as illustrated in FIG. 8. The IDCT processor 107 receives 12 bits of DCT data input in 2's complement format, and thus can range (with the sign bit) from −2048 to +2047. The first block 801 performs a sign change to convert to sign magnitude. If necessary, block 801 changes −2048 to −2047. This yields eleven bits of data and a data bit indicating sign. Second block 802 performs the function $QX^tQ$, which uses 0+16 bits for QQ, yielding one sign bit and 20 additional bits. Block 802 produces a 27 bit word after the multiplication (11 bits multiplied by 16 bits), and only the 20 most significant bits are retained. Block 803 multiplies the results of block 802 with the elements of the P matrix, above. The P matrix is one sign bit per element and 15 bits per element, producing a 35 bit word. The system discards the most significant bit and the 14 least significant bits, leaving a total of 20 bits. The result of block 804 is therefore again a one bit sign and a 20 data bits.

Block 805 converts the sign magnitude to two's complement, yielding a 21 bit output. The system adds four blocks into each buffer, with the buffers having 22 bits each. Block 805 transmits all 22 bits. Block 806 performs a sign change to obtain QX$^r$QP, and passes 22 bits with no carry to block 807.

Block 807 performs a matrix transpose of QX$^r$QP, yielding (QX$^r$QP)$^t$. Block 807 passes this transpose data to block 808 which performs a twos complement to sign-magnitude, yielding a one bit sign and a 21 bit word. Block 809 clips the least significant bit, producing a one bit sign and a 20 bit word. This result passes to block 810, which multiplies the result by the P matrix, having a one bit sign and a 15 bit word. The multiplication of a 20 bit word with 1 bit sign by a 15 bit word with 1 bit sign yields a 35 bit word, and the system discards the two most significant bits and the 13 least significant bits, producing a 20 bit word with a 1 bit sign out of block 810. The result of block 810 is sign-magnitude converted back to 2's complement, producing a 21 bit result in block 811. Block 812 performs a similar function to block 805, and adds the four products into each buffer. The buffers have 22 bits each, and the output from block 812 is 22 bits. This data is passed to block 813, which performs a sign switch to obtain the elements of (QX$^r$QP)$^t$P. Output from block 813 is a 22 bit word, with no carry. Block 814 right shifts the data seven bits, with roundoff, and not a clipping. In other words, the data appears as follows:

SIGNxxxxxxxxxxxxxxXYxxxxxx (22 bit word)

and is transformed by a seven bit shift in block 813 to:

SIGNxxxxxxxxxxxxxxX.Yxxxxxx

Depending on the value of Y, block 814 rounds off the value to keep 15 bits. If Y is 1, block 814 increments the integer portion of the word by 1; if Y is 0, block 814 does not change the integer part of the word.

The result is a 15 bit word, which is passed to block 815. In block 815, if the 15 bit value is greater than 255, the block sets the value to 255. If the value is less than −256, it sets the value to −256. The resultant output from block 815 is the IDCT output, which is a 9 bit word from −256 to 255. This completes the transformation from a 12 bit DCT input having a value between −2048 and 2047, and a 9 bit inverse DCT output, having a value between −256 and 255.

The coefficiencies for matrix multiplication are as follows. The four factors used which can fully define all elements of the QQ and P matrices are as follows:

$$f = \frac{1}{\sqrt{2}}, g = \frac{1}{\sqrt{a^2+1}}, h = \frac{1}{\sqrt{b^2+1}}, s = \frac{1}{\sqrt{c^2+1}}$$

The parameters for all elements of the QQ and PP matrix are:

$QQ_{01}=QQ_{04}=QQ_{40}=QQ_{44}=f^2=0.5=0.1000000000000000$ $QQ_{01}QQ_{07}=QQ_{41}=QQ_{47}=fg=0.13795=$
  0.0010001101010001

$QQ_{02}=QQ_{06}=QQ_{42}=QQ_{46}=fh=0.270598=$
  0.0100010101000110

$QQ_{03}=QQ_{05}=QQ_{43}=QQ_{45}=fs=0.392847=$
  0.0110010010010010

$QQ_{10}=QQ_{14}=QQ_{70}=QQ_{74}=fg=0.13795=$
  0.0010001101010001

$QQ_{11}=QQ_{17}=QQ_{71}=QQ_{77}=g^2=0.0380602=$
  0.0000100110111110

$QQ_{12}=QQ_{16}=QQ_{72}=QQ_{76}=gh=0.0746578=$
  0.0001001100011101

$QQ_{13}=QQ_{15}=QQ_{73}=QQ_{75}=gs=0.108386=$
  0.0001101110111111

$QQ_{20}=QQ_{24}=QQ_{60}=QQ_{64}=fh=0.270598=$
  0.0100010101000110

$QQ_{21}=QQ_{27}=QQ_{61}=QQ_{67}=gh=0.0746578=$
  0.0001101110111111

$QQ_{22}=QQ_{26}=QQ_{62}=QQ_{66}=h^2=0.146447=$
  0.0010010101111110

$QQ_{23}=QQ_{25}=QQ_{63}=QQ_{65}=hs=0.212608=$
  0.0011011001101101

$QQ_{30}=QQ_{34}=QQ_{50}=QQ_{54}=fs=0.392847=$
  0.0110010010010010

$QQ_{31}=QQ_{37}=QQ_{51}=QQ_{57}=gs=0.108386=$
  0.0001101110111111

$QQ_{32}=QQ_{36}=QQ_{52}=QQ_{56}=hs=0.212608=$
  0.0011011001101101

$QQ_{33}=QQ_{35}=QQ_{53}=QQ_{55}=S^2=0.308658=$
  0.0100111100000100

For the P matrix,
1=1=001000000000000
a=5.02734=101000001110000
b=2.41421=010011010100001
c=1.49661=001011111110010
r(a+1)=4.26197=100010000110001
r(a−1)=2.84776=010110110010001
r(c−1)=0.351153=000010110100000
r(c+1)=1.76537=001110001000000

The entire IDCT is implemented in two stages. IDCT Stage 1, illustrated in FIG. 9, implements X$_Q$P. The second stage, illustrated in FIG. 10, transposes the result and multiplies it by P again.

From FIG. 2, and as may be more fully appreciated from the illustrations of FIGS. 8 through 11, the TMCCORE 103 receives the DCT input, produces the matrix (QX$^r$Q)P, or X$_Q$P, in IDCT Stage 1 (i.e., from FIG. 8, completes through block 806) and stores the result in transpose RAM 923. IDCT Stage 2 performs the transpose of the result of IDCT Stage 1 and multiplies the result by P, completing the IDCT process and producing the IDCT output.

As may be appreciated from FIG. 9, the representation disclosed is highly similar to the flowchart of FIG. 8. From FIG. 9, IDCT Stage 1 pipeline 900 receives data from the IQ block in the form of the matrix X. The Q matrix is available from a row/column state machine in the IQ pipeline, depicted by state machine registers 902. The state machine registers 902 pass data from register 902$c$ to QQ matrix block 903 which contains QQ matrix generator 904 and QQ matrix register 905. QQ data is passed to QX$^r$Q block 901 which multiplies the 16 bit QQ matrix by the X block having one sign bit and 11 data bits in QX$^r$Q multiplier 906. This multiplication is passed to QX$^r$Q register 907, which transmits a one bit sign and a 20 bit word. QX$^r$Q block 901 thereby performs the function of block 802. Output from register 902$d$ is a column [2:0] which passes to P matrix block 908. P matrix block 908 comprises P matrix generator 909 which produces a sign bit and three fifteen bit words to P matrix register 910.

QX$^r$Q block 901 passes the one bit sign and 20 bit word to (QX$^r$Q)P block 911, which also receives the three fifteen bit words and one sign bit from P matrix block 908. (QX$^r$Q)P block 911 performs the function illustrated in block 803 in three multiplier blocks 912a, 912b, and 912c. The results of these multiplications is passed to (QX'Q)P MUX 913, which also receives data from register 902e in the form row[2:0]. Data from register 902e also passes to read address generator 914, which produces a transpose RAM read address. The transpose RAM read address passes to transpose RAM 923 and to first write address register 915, which passes data to write address register 916. The write address from write address register 916 and the read address from read address generator 914 pass to transpose RAM 923, along with the P matrix read row/column generator state machine 1001, illustrated below. (QX'Q)P MUX 913 thus receives the output from the three multiplier blocks 912a, 912b, and 912c as well as the output from register 902e, and passes data to (QX'Q)P register 917, which passes the (QX'Q)P matrix in a one bit sign and 20 bit word therefrom. As in block 804, these four data transmissions from $(QX^TQ)P$ block 911 pass to matrix formatting block 918. Matrix formatting block 918 performs first the function illustrated in block 802 by converting sign-magnitude to two's complement in two's complement blocks 919a, 919b, 919c, and 919d. The values of these four blocks 919a–d are added to the current values held in transpose RAM 923 in summation blocks 920a, 920b, 920c, and 920d. The transpose RAM 923 value is provided via register 921. Transpose RAM 923 is made up of 4 eight bit by 88 bit values, and each 22 bit result from the four summation blocks 920a, 920b, 920c, and 920d pass to register 922 and subsequently to transpose RAM 923. This completes processing for IDCT Stage 1.

Processing for IDCT Stage 2 1000 is illustrated in FIG. 10. P matrix read row/column generator state machine 1001 receives a transpose RAM ready indication and provides row/column information for the current state to transpose RAM 923 and to a sequence of registers 1002a, 1002b, 1002c, 1002d, and 1002e. The information from 1002b passes to Stage 2 P matrix block 1003, comprising Stage 2 P matrix generator 1004 and P matrix register 1005, which yields the one bit sign and 15 bit word for the P matrix.

From transpose RAM 923, two of the 22 bit transpose RAM elements pass to transpose block 1006, wherein transpose MUX 1007 passes data to registers 1008a and 1008b, changes the sign from one register using sign change element 1009 and passes this changed sign with the original value from register 1008b through MUX 1010. The value from MUX 1010 is summed with the value held in register 1008a in summer 1011, which yields the transpose of QX'QP, a 22 bit word. Thus the value of the data passing from the output of summer 1011 is functionally equal to the value from block 807, i.e. $(QX'QP)^t$. Two's complement/ sign block 1012 performs the function of block 808, forming the two's complement to sign-magnitude. The LSB is clipped from the value in LSB clipping block 1013, and this clipped value is passed to register 1014, having a one bit sign and a 20 bit word.

The output from transpose block 1006 is multiplied by the P matrix as functionally illustrated in block 810. This multiplication occurs in Stage 2 P multiplication block 1015, specifically in multipliers 1016a, 1016b, and 1016c. This is summed with the output of register 1002c in MUX 1017 and passed to register 1018. This is a matrix multiplication which yields (QX'QP)'P. Conversion block 1019 converts this information, combines it with specific logic and stores the IDCT values. First two's blocks 1020a, 1020b, 1020c, and 1020d convert sign-magnitude to two's complement, as in block 811, and sum this in adders 1021a, 1021b, 1021c, and 1021d with current IDCT RAM 1024 values, which comprise four 22 bit words. The sum of the current IDCT RAM values and the corrected (QX'QP)'P values summed in adders 1021a–d pass to IDCT RAM 1024.

IDCT RAM 1024 differs from transpose RAM 923. IDCT RAM 1024 provides a hold and store place for the output of IDCT Stage 2 values, and comprises two 88 by 1 registers. Note that IDCT RAM 1024 feeds four 22 bit words back to adders 1021a–d, one word to each adder, and passes eight 22 bit words from IDCT Stage 2 1000.

RAM 1024 also utilizes values passed from register 1002d, i.e. the position of read/write elements or the state of the multiplication. Register 1002d passes data to read additional combined logic element 1022, which calculates and passes a read add indication and a write add indication to RAM 1024 to properly read and write data from adders 1021a–d.

Data also passes from register 1002d to register 1002e, which provides information to output trigger generator 1023, the result of which is passed to RAM 1024 as well as out of IDCT Stage 2 1000. The output from RAM 1024 is eight 22 bit words and the output from output trigger generator 1023. The result functionally corresponds to the output from block 812.

FIG. 11 illustrates the implementation which performs the final functions necessary for IDCT output and stores the values in appropriate positions in IDCT OUTPUT RAM 1115. Sign corrector 1101 receives the eight 22 bit words from IDCT Stage 2 1000 and multiplexes them using MUX 1102 to four 22 bit words passing across two lines. These values are summed in summer 1103, and subtracted in subtractor 1104 as illustrated in FIG. 11. The output from subtractor 1104 passes through register 1105 and reverse byte orderer 1107, and this set of 4 22 bit words passes along with the value from summer 1103 to MUX 1107, which passes data to register 1108. This sign corrector block produces an output functionally comparable to the output of block 813, essentially providing the elements of (QX'QP)'P. Shift/roundoff block 1109 takes the results from sign corrector 1101, converts two's complement to sign/magnitude in element 1110, shifts the value right seven places using shifters 1111a, 1111b, 1111c, and 1111d, rounds these values off using round off elements 1112a, 1112b, 1112c, and 1112d, and passes these to element 1113. The rounded off values from round off elements 1112a–d functionally correspond to the output from block 814. The value is limited between −256 and +255 in element 1113, the output of which is a 15 bit word passed to sign block 1114, which performs a conversion to two's complement and passes four nine bit words to IDCT OUTPUT RAM 1115.

Output from the Output Trigger Generator and the chroma/luma values from CBP Luma/Chroma determine the stage of completeness of the IDCT RAM OUTPUT. IDCT RAM address/IDCT Done indication generator 1116, as with elements 914, 915, and 916, as well as elements 1022 and 1023, are placekeepers or pointers used to keep track of the position of the various levels of RAM, including the current position and the completion of the individual tasks for various levels of processing, i.e. IDCT Stage 1 progress, IDCT Stage 2 progress, and completion of the Stages. It is recognized that any type of bookkeeping, maintenance, or pointing processing can generally maintain values and placement information for reading, writing, and providing current location and completion of task indications to blocks or elements within the system while still within the scope of the current invention. The purpose of these elements is to provide such a bookkeeping function.

IDCT RAM address/IDCT Done indication generator 1116 receives output trigger generator 1023 output trigger information and CBP Luma/Chroma indications and provides a write address and a Luma Done/Chroma Done IDCT indication, signifying, when appropriate, the receipt of all necessary luma/chroma values for the current macroblock.

The system writes IDCT information to IDCT OUTPUT RAM 1115, specifically the information passing from sign block 1114 to the appropriate location based on the write address received from IDCT RAM address/IDCT Done indication generator 1116. IDCT OUTPUT RAM 1115 is broken into Luma (Y0, Y1, Y2, and Y3) locations, and Chroma (Cb and Cr) locations. The values of IDCT OUTPUT RAM 1115 represent the complete and final IDCT outputs.

The design disclosed herein provides IDCT values at the rate of 64 cycles per second. The design stores two blocks worth of data in transpose RAM 923 between IDCT Stage 1 and IDCT Stage 2.

Motion Compensation

Motion compensation for the two frame store and letter-box scaling for MPEG decoding operates as follows.

For a 2×7 array of pixels, i.e. 14 pels, the numbering of pels is illustrated in FIG. 12.

The system performs a half-pel compensation. Half-pel compensation is compensating for a location between pixels, i.e. the motion is between pixel x and pixel y. When the system determines the data in FIG. 12 must be right half pel compensated, or shifted right one half pel, the system performs the operation(s) outlined below.

$$0'=(0+1)/2; \text{ if } (0+1) \bmod 2==1, 0'=0'+1;$$

$$1'=(1+2)/2; \text{ if } (1+2) \bmod 2==1, 1'=1'+1; \ldots$$

$$5'=(5+6)/2; \text{ if } (5+6) \bmod 2==1, 5'=5'+1.$$

When the system determines the data in FIG. 12 must be down half pel compensated, or shifted downward one half pel, the system performs the operation(s) outlined below.

$$0'=(0+7)/2; \text{ if } (0+7) \bmod 2==1, 0'=0'+1;$$

$$1'=(1+8)/2; \text{ if } (1+8) \bmod 2==1, 1'=1'+1; \ldots$$

$$6'=(6+13)/2; \text{ if } (6+13) \bmod 2==1, 6'=6'+1.$$

Alternately, the system may indicate the desired position is between four pels, or shifted horizontally one half pel and down one half pel. When the system determines the data in FIG. 12 must be right and down half pel compensated, or shifted right one half pel and down one half pel, the system performs the operation(s) outlined below.

$$0'=(0+1+7+8)/4; \text{ if } (0+1+7+8) \bmod 4==1, 0'=0'+1;$$

$$1'=(1+2+8+9)/2; \text{ if } (1+2+8+9) \bmod 4==1, 1'=1'+1.$$

The aforementioned logic is implemented as illustrated in FIG. 13. As may be appreciated, a right half pel shift may require the system to point to a position one half-pel outside the block. Thus the system must compensate for odd-pel shifting.

From FIG. 13, the motion compensation unit 1300 comprises horizontal half pel compensatory 1301 and vertical half pel compensator 1302, as well as four banks of 36 flops 1303a, 1303b, 1303c, and 1303d. Registers 1304a, 1304b, 1304c, 1304d, and 1304e contain motion compensation data having 32 bits of information. These registers pass the motion compensation data to horizontal compensation MUXes 1305a, 1305b, 1305c, and 1305d, as well as horizontal adders 1306a, 1306b, 1306c, and 1306d as illustrated in FIG. 13. For example, register 1304e passes motion compensation data to horizontal compensation MUX 1305d, which subsequently passes the information to horizontal adder 1306d and adds this value to the value received from register 1304d. Register 1304a passes data to adder 1306a but does not pass data to any of the horizontal compensation MUXes 1305a–d. This summation/MUX arrangement provides a means for carrying out the right half-pel compensation operations outlined above. The result of the horizontal half pel compensator 1301 is four summed values corresponding to the shift of data one half pel to the right for a row of data.

As a luma macroblock has dimensions of 16×16, movement of one half pel to the right produces, for the 16th element of a row, a shift outside the bounds of the 16×16 macroblock. Hence a right shift produces a 16×17 pixel macroblock, a vertical shift a 17×16 pixel macroblock, and a horizontal and vertical shift a 17 by 17 pixel macroblock. The additional space is called an odd pel.

The compensation scheme illustrated in FIG. 13 determines the necessity of compensation and thereby instructs the MUXes disclosed therein to compensate by adding one half pel to each pel position in the case of horizontal pixel compensation. Thus out of the 32 bits from reference logic, data for each pel may be shifted right one pel using the MUX/adder arrangement of the horizontal half pel compensator 1301.

Vertical pel compensation operates in the same manner. For each of the pels in a macroblock, the data is shifted downward one half pel according to the vertical compensation scheme outlined above. Vertical half pel compensator 1302 takes and sums results from the horizontal half pel compensator 1301 and receives data from the four banks of 36 flops 1303a, 1303b, 1303c, and 1303d. Data from horizontal half pel compensator 1301 passes to vertical adders 1308a, 1308b, 1308c, and 1308d along with MUXed data from the four banks of 36 flops 1303a, 1303b, 1303c, and 1303d.

In cases where vertical and horizontal half pel compensation are required, the four banks of 36 flops 1303a, 1303b, 1303c, and 1303d are used by the system to store the extra row of reference data expected for down half-pel compensation. This data storage in the four banks of 36 flops 1303a–d provides the capability to perform the computations illustrated above to vertically and horizontally shift the data one half pel. The result is transmitted to register 1309, which may then be B-picture compensated and transmitted to motion compensation output RAM 1311.

Reference data averaging may be necessary for B-pictures having backward and forward motion vectors, or with P pictures having a dual-prime prediction. Either function is accomplished within the B-picture compensator 1310.

Prediction may generally be either frame prediction, field prediction, or dual-prime. Frame pictures for half pel compensation appear as follows.

In frame prediction, the luma reference data pointed to by a motion vector contains either 16×16 (unshifted), 16×17 (right half-pel shifted), 17×16 (down half-pel shifted), or 17×17 (right and down half-pel shifted) data. The chroma component, either Cr or Cb, contains either 8×8 (unshifted), 8×9 (right half-pel shifted), 9×8 (down half-pel shifted) or 9×9 (right and down half-pel shifted) data.

In field prediction as well as dual-prime predictions, the luma reference data pointed to by a motion vector contains either 8×16 (unshifted), 8×17 (right half-pel shifted), 9×16 (down half-pel shifted) or 9×17 (down and right half pel shifted) data. The chroma reference data, either Cr or Cb, contains either 4×8 (unshifted), 4×9 (right half-pel shifted), 5×8 (down half-pel shifted) or 5×9 (right and down half-pel shifted) data.

Field pictures for half-pel compensation may utilize field prediction, 16×8 prediction, or dual-prime. Field prediction and dual-prime prediction are identical to frame prediction in frame pictures, i.e. the luma and chroma references are as outlined above with respect to frame prediction (16×16, 16×17, 17×16, or 17×17 luma, 8×8, 8×9, 9×8, or 9×9 chroma). 16×8 prediction is identical to field prediction in frame pictures, i.e., luma and chroma are identical as outlined above with respect to field prediction (8×16, 8×17, 9×16, or 9×17 luma, 4×8, 4×9, 5×8, or 5×9 chroma).

The motion compensation unit 1300 accepts reference data 32 bits (4 pels) at a time while accepting odd pel data one pel at a time on the odd pel interface, The system ships luma reference data in units of 8×16 and chroma reference data in units of 4×8. Luma reference data is transferred before chroma reference data, and Cb chroma is shipped before Cr chroma.

In accordance with the motion compensation unit 1300 of FIG. 13, transfer of luma and chroma data occurs as follows.

For luma data, assuming that luma reference data is represented by luma [8:0] [16:0], or that data requires both right and down half-pel compensation. On a cycle by cycle basis, luma data is transferred as follows using motion compensation unit 1300:

| Cycle | Reference Data | Odd-Pel Data |
|---|---|---|
| 1 | Luma[0] [12:15] | Luma[0] [17] |
| 2 | Luma[0] [8:11] | |
| 3 | Luma[0] [4:7] | |
| 4 | Luma[0] [0:3] | |
| 5 | Luma[1] [12:15] | Luma[1] [16] |
| 6 | Luma[1] [8:11] | |
| 7 | Luma[1] [4:7] | |
| 8 | Luma[1] [0:3] | |
| ... | ... | ... |
| 33 | Luma[8] [12:15] | Luma[8] [16] |
| 34 | Luma[8] [8:11] | |
| 35 | Luma[8] [4:7] | |
| 36 | Luma[8] [0:3] | |

For chroma reference data represented by Chroma [4:0] [8:0]. The motion compensation unit 1300 transfers data on a cycle by cycle basis as follows:

| Cycle | Reference Data | Odd-Pel Data |
|---|---|---|
| 1 | Chroma[0] [4:7] | Chroma[0] [8] |
| 2 | Chroma[0] [0:3] | |
| 3 | Chroma[1] [4:7] | Chroma [1] [8] |
| 4 | Chroma[1] [0:3] | |
| ... | ... | ... |
| 9 | Chroma[4] [4:7] | Chroma[4] [8] |
| 10 | Chroma[4] [0:3] | |

Data expected by motion compensation units for the combinations of picture type, prediction type, and pel compensation are as follows:

| Picture Type | Prediction Type | Pel Compensation | Data fetched by vector (in pels) Luma/Chroma |
|---|---|---|---|
| Frame | Frame | None | 16 × 16/8 × 8 |
| | | Right | 16 × 17/8 × 9 |
| | | Vertical | 17 × 16/9 × 8 |
| | | Right/Vert. | 17 × 17/9 × 9 |
| | Field | None | 8 × 16/4 × 8 |
| | | Right | 8 × 17/4 × 9 |
| | | Vertical | 9 × 16/5 × 8 |
| | | Right/Vert. | 9 × 17/5 × 9 |
| | Dual-Prime | None | 8 × 16/4 × 8 |
| | | Right | 8 × 17/4 × 9 |
| | | Vertical | 9 × 16/5 × 8 |
| | | Right/Vert. | 9 × 17/5 × 9 |
| Field | Field | None | 16 × 16/8 × 8 |
| | | Right | 16 × 17/8 × 9 |
| | | Vertical | 17 × 16/9 × 8 |
| | | Right/Vert. | 17 × 17/9 × 9 |
| | 16 × 8 | None | 8 × 16/4 × 8 |
| | | Right | 8 × 17/4 × 9 |
| | | Vertical | 9 × 16/5 × 8 |
| | | Right/Vert. | 9 × 17/5 × 9 |
| | Dual-Prime | None | 16 × 16/8 × 8 |
| | | Right | 16 × 17/8 × 9 |
| | | Vertical | 17 × 16/9 × 8 |
| | | Right/Vert. | 17 × 17/9 × 9 |

Reference data transfer to the TMCCORE 103 occurs as follows.

Luma Data

| Reference Motion Vector Data | Transfer Order to Motion Compensation Unit 1300 |
|---|---|
| 17 × 17 | 1) 9 × 17 |
| | 2) 8 × 17 |
| 16 × 16 | 1) 8 × 16 |
| | 2) 8 × 16 |
| 17 × 16 | 1) 9 × 16 |
| | 2) 8 × 16 |
| 16 × 17 | 1) 8 × 17 |
| | 2) 8 × 17 |
| 8 × 16 | 8 × 16 |
| 9 × 16 | 9 × 16 |
| 8 × 17 | 8 × 17 |
| 9 × 17 | 9 × 17 |

Chroma Data

| Reference Motion Vector Data | Transfer Order to Motion Compensation Unit 1300 |
|---|---|
| 9 × 9 | 1) 5 × 9 |
| | 2) 4 × 9 |
| 8 × 9 | 1) 4 × 9 |
| | 2) 4 × 9 |
| 9 × 8 | 1) 5 × 9 |
| | 2) 4 × 9 |
| 8 × 8 | 1) 4 × 8 |
| | 2) 4 × 8 |
| 4 × 8 | 4 × 8 |
| 4 × 9 | 4 × 9 |
| 5 × 8 | 5 × 8 |
| 5 × 9 | 5 × 9 |

The maximum amount of reference data (in bytes) that the system must fetch for any macroblock conforming to the 4:2:0 format occurs in a frame picture/field prediction/B- picture, a field picture/16×8 prediction/B-picture, or a frame picture/dual prime. The amount of luma reference data expected, excluding odd pel data, is 4*9*16 or 576 bytes of data. The amount of luma reference data (for both Chroma blue and Chroma red, excluding half-pel data, is 2*4*5*8 or 320 bytes.

Data may be processed by the motion compensation unit 1300 at a rate of 4 pels per cycle. The total number of cycles required to process the data is 576+320/4, or 224 cycles. This does not include odd pel data which is transferred on a separate bus not shared with the main data bus.

While the invention has been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

What is claimed is:

1. A system for performing an inverse discrete cosine transform from discrete cosine transform data, comprising:
   a first stage comprising (i) a plurality of matrix generators configured to generate predetermined matrices and (ii) a plurality of first stage matrix multipliers configured to generate an output in response to said discrete cosine transform data and said plurality of predetermined matrices;
   a transpose RAM; and
   a second stage comprising (i) a transposer configured to transpose by interchanging rows and columns of data held in said transpose RAM and (ii) a second stage matrix multiplier configured to generate an output in response to said transposed data and one of said plurality of predetermined matrices;
   wherein said second stage is configured to shift with round off, and limit values of inverse discrete cosine transform data.

2. The system of claim 1, wherein said plurality of matrix generators further comprises a P matrix generator, wherein P is a predetermined matrix.

3. The system of claim 1, wherein said plurality of matrix generators comprises a QQ matrix generator, wherein Q is a predetermined diagonal matrix.

4. The system of claim 1, wherein said first stage comprises two matrix generators.

5. The system of claim 1, wherein the first stage matrix multipliers comprise:
   a QQ multiplier which premultiplies incoming data by a Q matrix and subsequently postmultiplies by the Q matrix, where the Q matrix is a predetermined diagonal matrix; and
   a P multiplier which postmultiplies incoming data by a P matrix, where P is a predetermined matrix.

6. The system of claim 5, wherein the second stage matrix multiplier comprises a P multiplier.

7. The system of claim 1, wherein the transposer performs the matrix transpose of a received matrix.

8. A method for converting discrete cosine transform data into inverse discrete cosine transform data, comprising the steps of:
   (A) premultiplying and postmultiplying the discrete cosine transform data by a first predetermined matrix;
   (B) postmultiplying the result of said premultiplying and postmultiplying step by a second predetermined matrix;
   (C) transposing by interchanging rows and columns of the result of said postmultiplying step;
   (D) postmultiplying the result of said transposing step by said second predetermined matrix;
   (E) shifting with rounding the result of said second postmultiplying step; and
   (F) limiting the result of said shifting with rounding step.

9. The method of claim 8, wherein said first predetermined matrix is diagonal.

10. The method of claim 8, further comprising the steps of:
    converting data from said first postmultiplying step to two's complement after said first postmultiplying step;
    converting data from said transposing step to sign-magnitude after said transposing step; and
    converting data from said second postmultiplying step to two's complement after said second postmultiplying step.

11. The method of claim 8, further comprising the steps of:
    shifting data after said first postmultiplying step into a transpose RAM; and
    receiving data from said transpose RAM prior to said transposing step.

12. The method of claim 8, further comprising the steps of:
    shifting data after said first postmultiplying step into a transpose RAM; and
    receiving data from said transpose RAM prior to said transposing step.

13. A method for converting discrete cosine transform data into inverse discrete cosine transform data, comprising the steps of:
    (A) performing a first predetermined series of matrix manipulations on the discrete cosine transform data;
    (B) providing output from said first performing step to a first memory;
    (C) interchanging rows and columns of data received from said first memory to present a transpose matrix;
    (D) performing a second predetermined series of matrix manipulations on said transpose matrix; and
    (E) providing output from said second performing step to a second memory, wherein said second predetermined series of matrix manipulations comprise shifting with round off and limiting values of said inverse discrete cosine transform data.

14. The method of claim 13, further comprising:
    generating a plurality of predetermined matrices prior to said first performing step.

15. The method of claim 13, wherein said first predetermined series of matrix manipulations comprises:
    premultiplying and postmultiplying data by a first predetermined matrix; and
    postmultiplying data by a second predetermined matrix.

16. The method of claim 15, wherein said first predetermined matrix is diagonal.

17. The method of claim 15, wherein said second series of matrix manipulations comprises
    postmultiplying data by said second predetermined matrix.

18. The method of claim 13, wherein said rounding is performed on data held in said second memory.

19. The method of claim 13, wherein said first memory comprises a transpose RAM.

20. A system for performing an inverse discrete cosine transform from discrete cosine transform data, comprising:

means for premultiplying and postmultiplying the discrete cosine transform data by a first predetermined matrix;

means for postmultiplying the result of said means for premultiplying and postmultiplying by a second predetermined matrix;

means for transposing by interchanging rows and columns of the result of said postmultiplying step;

means for postmultiplying the result of said transposing step by said second predetermined matrix;

means for shifting with rounding the result of said means for second postmultiplying; and means for limiting the result of said means for shifting with rounding.

* * * * *